United States Patent Office 3,579,371
Patented May 18, 1971

3,579,371
BARRIER STRUCTURE FOR PACKAGING PURPOSES
Joseph A. Dooley, Cedar Grove, and Michael J. Gnozzio, Lincoln Park, N.J., assignors to Inmount Corporation
No Drawing. Filed May 22, 1968, Ser. No. 731,319
Int. Cl. B32b 29/06, 23/08; B44d 1/14
U.S. Cl. 117—76                                    3 Claims

ABSTRACT OF THE DISCLOSURE

A packaging structure comprising a cellulosic substrate carrying a subcoating of a polyvinylidene chloride resin and a topcoating consisting of a blend of an alkyd resin and an amine-aldehyde resin.

---

This invention relates to novel packaging structures; more particularly it is directed to two-coat resin compositions which exhibit excellent barrier properties when applied to cellulosic support material.

One of the primary protective functions of packaging structures is to prevent the passage of foreign substances through the structure which would change or contaminate the product therein. Resinous coatings have been employed extensively in the packaging industry to impart protective barrier properties to various support materials. In the packaging of consumer products, polyvinylidene chloride coatings have found widespread use as barrier coatings to prevent the passage of oxygen, water vapor and other gaseous substances through packaging structures. While the barrier properties of polyvinylidene chloride coatings are excellent there are a number of deficiencies in the dried film which prohibit or limit its use for some packaging applications. Some of the deficiencies of polyvinylidene chloride coatings are: (a) relatively poor gloss even at high applied weights, (b) poor heat resistance at temperatures above 250° F., (c) relatively poor abrasion and mar resistance, (d) lack of product resistance to products having a high pH, (e) difficulty in obtaining perfect film continuity without multiple coats and extremely heavy film weights.

One of the objects of the present invention is to prepare coatings for packaging structures which display extremely high gloss while maintaining high levels of water vapor transmission resistance.

An additional object of the present invention is to provide coatings for packaging structures that are resistant to marring by heated sealing bars up to 400° F. and are also highly resistant to surface abrasion.

The objects of the invention are achieved by providing a cellulosic base film having at least one surface coated with two coatings:

(1) a thermoplastic subcoating comprising a polyvinylidene chloride resin,
(2) a thermosetting topcoating comprising a blend of an alkyd resin and an amine-aldehyde resin.

The packaging structures of this invention exhibit high gloss, high levels of water vapor transmission resistance, complete resistance to marring by heated sealing bars up to 400° F., excellent alkali resistance over prolonged periods and high resistance to surface abrasion.

The film or base substrates of this invention are cellulosic materials selected from the group consisting of paper, glassine, cellophane, paper board, and pouch stock which are commonly employed in the packaging industry.

The subcoating composition comprises a thermoplastic polyvinylidene chloride resin. Illustrative of the polyvinylidene chloride resins which are applicable in the practice of this invention are copolymers of vinylidene chloride copolymerized with at least one other olefinically unsaturated monomer. A wide variety of olefinically unsaturated monomers may be copolymerized with vinylidene chloride. These olefinically unsaturated monomers may include nitriles, such as acrylonitrile and methacrylonitrile; the alkyl esters of acrylic and/or methacrylic acids such as methyl, ethyl, propyl, butyl, ethyl, hexylacrylate, alkyl esters of itaconic acid, particularly lower itaconic esters such as methyl itaconate, butyl itaconate, dimethyl itaconate and dibutyl itaconate and other nitrogen-vinyl polymers such as N-vinyl-2-pyrrolidone. Vinyl ketones such as methyl vinyl ketone, ethyl vinyl ketone and vinyl phenyl ketone, acrolein and methacrolein, amides such as acrylamide, methacrylamide, methylolacrylamide and methylol-methacrylamide; hydroxy compounds such as ethylene glycol monoacrylate and monomethacrylate, propylene glycol monoacrylate and monomethacrylate, glycerol monoacrylate and monomethacrylate and hydroxyethyl methacrylate; glycidyl acrylate and glycidyl methacrylate; styrene, alpha-methyl styrene and the various vinyl toluenes; ethylene glycol dimethacrylate; chloroprene and isoprene; cyclopentadiene and substituted cyclopentadiene such as dihydroxy cyclopentadiene; 2-hydroxymethyl-5-norbornene; maleic anhydride as well as esters of unsaturated dibasic acids such as dimethyl maleate and dibutyl fumarate; vinyl esters such as vinyl acetate, vinyl propionate and vinyl stearate as well as vinyl chloride; and vinyl alkyl ethers such as vinyl butyl ether, vinyl ethyl ether and vinyl hexyl ether.

The polyvinylidene chloride resins employed in this invention are prepared by free-radical addition polymerization. Suitable free-radical initiators include azo compounds such as azo-bis-isobutyronitrile, organic peroxygen compounds such as lauryl peroxide, acetyl peroxide, benzoyl peroxide, cumene hydroperoxide, etc.

The polyvinylidene chloride subcoat composition may be applied in the form of an aqueous latex or from solutions of the polymers in organic solvents.

The solvents employed in the subcoat composition are selected from any of the conventional solvents for polyvinylidene chloride resins such as acetone, methyl ethyl ketone, methyl isobutyl ketone, ethyl acetate, n-butyl acetate, etc.

The amount of polyvinylidene chloride subcoating composition applied to the cellulosic substrate is from 0.3 to 5.0 pounds per 1,000 sq. ft.; the thickness of the dried film is from 0.1 to 1 mil.

The alkyd resin is preferably a glyceryl-phthalate alkyd which may be oil-modified.

Alkyd resins are defined as the resinous esters of the reaction of polybasic acids such as phthalic and maleic acids and their anhydrides and polyhydric alcohols such as glycerol and pentaerythritol. In a great many alkyds, the resinous ester is modified with drying, semi-drying and non-drying oils. Drying oil alkyds are alkyds which dry in air and are modified by the fatty acids of drying oils such as linseed oil, dehydrated castor oil, menhaden oil and perilla oil. Semi-drying oil alkyds are alkyds which dry on baking and are modified by the fatty acids of semi-drying oils such as soya bean oil. Non-drying alkyds are alkyds which normally do not dry even on baking and are modified by the fatty acids of non-drying oils such as coconut oil, castor oil and cottonseed oil.

The preparation and physical properties of alkyd resins are described in numerous texts, such as vol. I to "Organic Coating Technology," Henry Fleming Payne, John Wiley and Sons, Inc., N.Y., 1954.

The polycarboxylic acids used in the preparation of the alkyds may be any of those generally employed in the preparation of this type of resin. These acids may possess two, three, four, or more carboxyl groups and may be aliphatic, alicyclic, heterocyclic, or aromatic and may be saturated or unsaturated. Examples of such acids are malonic, glutaric, succinic, suberic, citric, tricarballylic, cyclohexanedicarboxylic, maleic, fumaric, itaconic, citraconic, mesaconic, phthalic, isophthalic, terephthalic, 1,8-naphthalic, adipic, sebacic, azelaic, pimelic, chlorosuccinic, bromomaleic, and dichlorophthalic.

Phthalic acid is the preferred acid. The phthalic acid may of course be in the form of its anhydride.

Alkyd-resin-forming polyhydric alcohols which are operable in preparing the alkyd resins used in the present invention include trihydric alcohols such as glycerol, tetrahydric alcohols such as erythritol, and pentaerythritol, and hexahydric alcohols such as mannitol and sorbitol. It will be seen that these alcohols are those which are conventionally used in preparing alkyd resins and our experiments indicate that the invention is operable with alkyd-resin-forming polyhydric alcohols in general. The term "alkyd-resin-forming polyhydric alcohol" is meant to include polyhydric compounds which are conventionally used in the manufacture of alkyds and which, as those persons skilled in the art know, do not contain all sorts of reactive substituents which alter the course of the alkyd-resin-forming reaction. Such substances as cellulose, starch and sugars are therefore excluded. The polyhydric alcohols, which are alkyd-resin-forming polyhydric alcohols, are in general, polyhydric alcohols containing from three to about ten hydroxyl groups, and containing no other substituent groups that are reactive under the conditions used in preparing alkyd resins. A minor amount of dihydric alcohols can be used along with the higher polyfunctional alcohols if desired.

In addition, alkyd resins known as resinous plasticizers, glycol, glycerol or polyglycol sebacates may be also used in the practice of this invention.

The amine-aldehyde resin which is blended with the alkyd resin may be any of the standard commercial urea-formaldehyde or melamine-formaldehyde resins including triazine-formaldehyde resins such as guanamine-formaldehydes, substituted melamine-formaldehyde resins such as hexamethyl ether of hexamethylol melamine, etc. Etherified ureaformaldehyde and melamine-formaldehyde are also operable in this invention. The amine-aldehyde resin can be made by reaction of an aldehyde (preferably formaldehyde) with a polyfunctional amide, such as urea, biuret, dicyanamide and triazines such as ammeline, melamine, substituted melamines and benzoguanamine.

The solvents employed in the topcoat compositions of this invention are primarily aromatic hydrocarbons such as xylene, toluene, benzene, aliphatic esters and aliphatic ketones. Amounts up to 50 parts by weight of alkanols such as ethanol, propanol, butanol, etc. may also be present.

Preferably from 1 to 9 parts of the alkyd resin are used for each part of amine aldehyde resin.

The amount of alkyd-amine aldehyde resin topcoat solution applied is from 0.5 to 2.0 pounds per 1,000 sq. ft.; the thickness of the dried film is from 0.1 to 0.5 mil.

Any of the conventional additives such as waxes, plasticizers or wetting agents used in coating compositions may be used in the coating compositions of the invention.

Mositure or water vapor permeability is determined by placing the test film, 5⅝ inch diameter, over the top of an aluminum cup containing 50 cc. of #8 mesh calcium chloride. The specimen is placed in a General Foods MVT Cabinet which is set for 100° F. and 92% relative humidity for 24 hours preconditioning period; it is then removed and placed in a desiccator for four hours and then weighed accurately. The specimen is placed in the cabinet for 68 hours, then removed and placed in the desiccator for four hours and weighed. The weight gain is then converted to grams of water gained/24 hours/100 square inches.

The coatings of this invention may be applied by any of the conventional coating techniques such as flexo rotogravure, roller coating, curtain coating, gravure coating, etc.

Unless otherwise indicated, all proportions in this specification and claims are by weight. The following examples will further illustrate the invention.

EXAMPLE 1

A cellophane film was coated with a 25% solids solution of a copolymer obtained from 80 parts by weight vinylidene chloride and 20 parts by weight acrylonitrile in methyl ethyl ketone. The coating was applied at a rate of 0.3 pound per 1,000 sq. ft. After the subcoating was dried at 250° F. for 1 second the following components were blended into a topcoat solution:

| | |
|---|---|
| A 50% solution in 3:1 toluene:butanol of an alkyd resin made from 46.4% phthalic anhydride, 27.2% glycerine and 26.4% Emery 894 fatty acid (mixture consisting principally of $C_{16}$ and $C_{18}$ monobasic acids) | 76.75 |
| Hexamethyl ether of hexamethyl melamine | 5.95 |
| Microcrystalline wax | 1.95 |
| Butyl alcohol | 5.00 |
| Xylene | 5.00 |
| Toluene | 5.35 |

The above topcoat composition was applied at the rate of 0.5 pound per 1000 sq. ft. over the polyvinylidene chloride coated film. The topcoat was dried at 350° F. for about 3 seconds.

The moisture vapor permeability of the packing structure was 0.7 gram/100 square inches/24 hours as compared to 3.5 grams/100 square inches/24 hours for the vinylidene chloride acrylonitrile subcoating.

EXAMPLE 2

A cellulosic substrate, 18 point clay coated bleached sulfite, was coated with the subcoating composition described in Example 1 at the rate of 1.0 pound per 1,000 sq. ft. After the subcoating was dried, the following components were blended into a topcoat composition.

| | |
|---|---|
| A 50% solution in 3:1 toluene:butanol of an alkyd resin made from 26.7% phthalic anhydride, 25.1% pentaerythritol, 14.4% benzoic acid, 33.8% Emery 894 fatty acid | 67.20 |
| Hexamethyl ether of hexamethyl melamine | 15.65 |
| Microcrystalline wax | 0.75 |
| Butyl alcohol | 6.25 |
| Xylene | 10.15 |

The above topcoat composition was applied over the polyvinylidene chloride coating at the rate of 1.0 pound per 1,000 square feet, and dried at 350° F. for 1 second.

The resulting coating of the packaging structure was mar resistant and has good gloss. The MVT of the packaging structure was 1.5 grams/100 square inches/24 hours as compared to 4.0 grams/100 square inches/24 hours for the vinylidene chloride-acrylonitrile coating alone.

EXAMPLE 3

A cellulosic film substrate, 35 pound glassine, was coated with a 30% solids solution of a copolymer obtained from 80 parts vinylidene chloride, 12 parts hydroxypropyl acrylate and 8 parts acrylic acid in methyl ethyl ketone. The subcoating is applied at the rate of 5 pounds per 1,000 sq. ft. and dried at 250° F. for 1.0 second.

The topcoat composition described in Example 1 was applied over the above polyvinylidene chloride coating at the rate of 0.5 pound per 1,000 sq. ft. The resulting packaging structure possessed the same excellent properties as the structure obtained from Example 1. The topcoated structure had an MVT of 0.15 gram/100 square inches/24 hours as compared to 0.44 for the uncoated polyvinylidene chloride coated structure.

EXAMPLE 4

A cellulosic film, 60# clay coated bleached sulfite, was coated with the polyvinylidene chloride subcoat of Example 3 at the rate of 0.5 pound per 1,000 sq. ft. After the subcoating was dried the topcoat composition of Example 2 was applied at the rate of 1.0 pound per 1,000 sq. ft. The resulting packaging structure exhibited the same excellent properties as the structure from Example 2. The MVT of the topcoated structure was 0.75 gram/100 square inches/24 hours as compared to 2.0 for the polyvinylidene coated package structure.

EXAMPLE 5

A cellulosic substrate, 22 point clay coated newsback, was coated with a 60% solids polyvinylidene chloride latex, Daran 210. The subcoating was applied at the rate of 3.0 pounds per 1,000 sq. ft. and dried at 300° F. for 30 seconds.

The topcoat composition described in Example 1 was applied over the above subcoating at the rate of 1.0 pound per 1,000 sq. ft. and dried at 350° F. for 3 seconds. The packaging structure exhibited the same properties as the structure in Example 1. The MVT was 0.55 gram/100 square inches/24 hours; the polyvinylidene chloride coated package had an MVT of 26.

EXAMPLE 6

A cellulosic film base, 30# pouch paper, was coated with a 60% solids polyvinylidene chloride latex, Daran 210, at the rate of 1.0 pound per 1,000 sq. ft.

The topcoat composition described in Example 2 was applied over the above subcoating at the rate of 0.5 pound per 1,000 sq. ft. and dried at 350° F. for 1.0 second. The packaging structure exhibited the same excellent properties of Example 2. The MVT of the topcoated structure was 0.23 gram/100 square inches/24 hours; the polyvinylidene coated package was 0.55 gram/100 square inches/24 hours.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:
1. A packaging structure consisting of a cellulosic substrate selected from paper, glassine, cellophane, paper board or pouch stock, having at least one surface coated with
   (a) a subcoating consisting essentially of a polyvinylidene chloride resin selected from the group consisting of
      (1) a copolymer obtained from 80 parts by weight vinylidene chloride and 20 parts acrylonitrile and
      (2) an interpolymer obtained from 80 parts vinylidene chloride, 12 parts hydroxypropyl acrylate and 8 parts acrylic acid, and
   (b) a topcoating directly on the subcoating consisting essentially of the dried residue of an organic solvent solution of from 1 to 9 parts of a glyceryl phthalate alkyd resin and one part of the hexamethyl ether of hexamethylol melamine.
2. The article of claim 1 wherein the polyvinylidene chloride resin is a copolymer obtained from 80 parts by weight of vinylidene chloride and 20 parts by weight of acrylonitrile.
3. The article of claim 1 wherein the polyvinylidene chloride resin is an interpolymer obtained from 80 parts vinylidene chloride, 12 parts hydroxypropyl acrylate and 8 parts acrylic acid.

References Cited

UNITED STATES PATENTS

| | | |
|---|---|---|
| 2,462,185 | 2/1949 | Hauser _____ 117—76(F)X |
| 2,476,627 | 7/1949 | Rote _____ 117—76(P) |
| 2,575,443 | 11/1951 | Cornwell _____ 117—76(F)X |
| 2,684,919 | 7/1954 | Berry et al. _____ 117—76(F) |
| 2,721,150 | 10/1955 | Grantham _____ 117—76(F)X |
| 2,919,206 | 12/1959 | Malmquist _____ 117—76(T) |
| 3,008,847 | 11/1961 | La Berge _____ 117—72 |

MURRAY KATZ, Primary Examiner

R. HUSACK, Assistant Examiner

U.S. Cl. X.R.

117—72, 92, 145, 155